United States Patent
Karsch et al.

(10) Patent No.: US 9,471,967 B2
(45) Date of Patent: Oct. 18, 2016

(54) RELIGHTING FRAGMENTS FOR INSERTION INTO CONTENT

(75) Inventors: Kevin Karsch, Urbana, IL (US); Zicheng Liao, Urbana, IL (US); David Forsyth, Urbana, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 0 days.

(21) Appl. No.: 14/411,359

(22) PCT Filed: Jul. 20, 2012

(86) PCT No.: PCT/US2012/047628
§ 371 (c)(1),
(2), (4) Date: Jun. 25, 2015

(87) PCT Pub. No.: WO2014/014476
PCT Pub. Date: Jan. 23, 2014

(65) Prior Publication Data
US 2015/0302563 A1 Oct. 22, 2015

(51) Int. Cl.
*G06T 5/00* (2006.01)
*H04N 5/272* (2006.01)
*G06T 15/50* (2011.01)
*G06T 19/00* (2011.01)
*H04N 5/222* (2006.01)
(Continued)

(52) U.S. Cl.
CPC .................. *G06T 5/008* (2013.01); *G06T 5/50* (2013.01); *G06T 11/60* (2013.01); *G06T 15/503* (2013.01); *G06T 19/00* (2013.01); *H04N 5/2226* (2013.01); *H04N 5/272* (2013.01); *G06T 2207/10024* (2013.01); *G06T 2207/20101* (2013.01); *G06T 2207/20221* (2013.01)

(58) Field of Classification Search
CPC ......... G06T 5/40; G06T 5/001; G06T 5/009; G06T 5/50; G06T 5/20
See application file for complete search history.

(56) References Cited

U.S. PATENT DOCUMENTS

| 5,864,342 A * | 1/1999 | Kajiya ................. G06T 11/001 345/418 |
| 6,229,553 B1 | 5/2001 | Duluk, Jr. et al. |

(Continued)

FOREIGN PATENT DOCUMENTS

WO  WO-2014014476  1/2014

OTHER PUBLICATIONS

International Search Report and Written Opinion, Application No. PCT/US2012/047628, Sep. 24, 2012, 7 pages.
(Continued)

*Primary Examiner* — Duy M Dang
(74) *Attorney, Agent, or Firm* — Wolfe-SBMC

(57) ABSTRACT

A fragment is relit for insertion into a target scene of an image by obtaining a fragment model for the fragment. A set of detail maps for the fragment model are generated, each of which encodes fine-scale shading effects from the surface detail of the fragment. A target scene model is obtained for the target scene, and the fragment model is inserted into the target scene model. The target scene model with inserted fragment model is rendered, and a composited target scene is generated. A modified target scene is generated by combining the composited target scene and the set of detail maps. Weights assigned to the different detail maps can be changed by the user, allowing the modified target scene to be readily altered without re-rendering the target scene model with the inserted fragment model.

23 Claims, 8 Drawing Sheets

(51) Int. Cl.
  G06T 5/50    (2006.01)
  G06T 11/60   (2006.01)

(56) References Cited

U.S. PATENT DOCUMENTS 7,433,191 B2    10/2008 Blanco, Jr.
2010/0210358 A1  8/2010 Csurka et al.

OTHER PUBLICATIONS

Agarwala,"Interactive digital photomontage", ACM Transactions on Graphics (Proc. SIGGRAPH), 23(3), 294-302, 2004, 2004, 9 pages.
Akers,"Conveying Shape and Features with Image-Based Relighting", Proceedings of the 14th IEEE Visualization 2003, Oct. 2003, 6 pages.
Anjum,"Improved Face Recognition using Image Resolution Reduction and Optimization of Feature Vector", Thesis, Department of Computer Engineering, College of Electrical Engineering and Mechanical Engineering, National University of Sciences and Technology (NUST) Rawalpindi Pakistan, Jan. 2008, 209 pages.
Arikan,"Fast and Detailed Approximate Global Illumination by Irradiance Decomposition", Computer Graphics Proceedings, Annual Conference Series, 2005, Jul. 31, 2005, pp. 1108-1114.
Barrow,"Recovering Intrinsic Scene Characteristics from Images", In Comp. Vision Sys, 1978, Apr. 1978, 23 pages.
Bitouk,"Face Swapping: Automatically Replacing Faces in Photographs", Retrieved from: <http://graphics.tu-bs.de/teaching/seminars/ws0809/CG/studentwebsites/AndreaKeil/> on Jan. 7, 2010, Aug. 2008, 6 pages.
Blake,"Boundary Conditions for Lightness Computation in Mondrian World", Computer Vision, Graphics and Image Processing, May 22, 1985, pp. 314-327.
Brelstaff,"Computing Lightness", Pattern Recognition Letters 5, 2, Feb. 1987, 10 pages.
Carroll,"Illumination Decomposition for Material Recoloring with Consistent Interreflections", ACM Trans. Graph. 30, Aug. 2011, 9 pages.
Chen,"Sketch2Photo: Internet Image Montage", ACM Transactions on Graphics (TOG)—Proceedings of ACM SIGGRAPH Asia 2009, Dec. 2009, 10 pages.
Criminisi,"Single View Metrology", Int. J. Comput. Vision 40, Nov. 2000, 8 pages.
Debevec,"Rendering Synthetic Objects into Real Scenes: Bridging Traditional and Image-Based Graphics with Global Illumination and High Dynamic Range Photography", University of California at Berkeley; In SIGGRAPH 98, Jul. 1998, 10 pages.
Dunham,"Data Mining Introductory and Advanced Topics", Companion slides for the text by Dr. M.H.Dunham, Data Mining, Introductory and Advanced Topics, Prentice Hall, 2002., 2002, 83.
Durou,"Numerical Methods for Shape-from-shading: A New Survey with Benchmarks", Jan. 2008, 49 pages.
Endres,"Category Independent Object Proposals", In Proceedings of the 11th European conference on Computer vision:, Sep. 2010, 14 pages.
Fang,"Textureshop: Texture Synthesis as a Photograph Editing Tool", In SIGGRAPH '04, Aug. 2004, 6 pages.
Farenzena,"Recovering Intrinsic Images Using an Illumination Invariant Image", In ICIP, 2007, 4 pages.
Fattal,"Multiscale Shape and Detail Enhancement from Multi-light Image Collections", In SIGGRAPH '07, Aug. 2007, 9 pages.
Forsyth,"Variable-source Shading Analysis", International Journal of Computer Vision, Oct. 15, 2010, 23 pages.
Funt,"Recovering Shading from Color Images", ECCV '92, Second European Conference on Computer Vision, May 1992, 14 pages.
Grosse,"Ground truth dataset and baseline evaluations for intrinsic image algorithms", In International Conference on Computer Vision, Oct. 2009, 10 pages.
Haddon,"Shading Primitives: Finding Folds and Shallow Grooves", In Int. Conf. on Computer Vision, Mar. 2, 1998, 6 pages.
Hedau,"Recovering the Spatial Layout of Cluttered Rooms", In ICCV 2009, 2009, 8 pages.
Horn,"Determining lightness from an image", Computer Graphics and Image Processing, Jun. 1974, 23 pages.
Horry,"Tour into the Picture: Using a Spidery Mesh Interface to Make Animation from a Single Image", Proceedings of the 24th annual conference on Computer graphics and interactive techniques. ACM Press/Addison-Wesley Publishing Co., 1997, 9 pages.
Johnston,"Lumo: Illumination for Cel Animation", NPAR '02 Proceedings of the 2nd international symposium on Non-photorealistic animation and rendering; 2002., 9 pages.
Kang,"Tour Into the Picture using a Vanishing Line and its Extension to Panoramic Images", Computer Graphics Forum, vol. 20, No. 3, Sep. 2001, 11 pages.
Karsch,"Rendering Synthetic Objects into Legacy Photographs", ACM Transactions on Graphics (TOG), Dec. 1, 2011, 12 pages.
Khan,"Image-Based Material Editing", ACM Trans. Graph. 25, Jul. 2006, 10 pages.
Krivanek,"Radiance Caching for Efficient Global Illumination Computation", IEEE Transactions on Visualization and Computer Graphics, 2005, 11 pages.
Lalonde,"Photo Clip Art", Computer Graphics Proceedings, Annual Conference, Aug. 2007, pp. 1-10.
Land,"Lightness and Retinex Theory", Journal of the Optical Society of America, vol. 61, No. 1, Jan. 1971, 11 pages.
Levin,"A Closed Form Solution to Natural Image Matting", CVPR, 2006, 2006, 8 pages.
Levin,"Spectral Matting", IEEE Conference on Computer Vision and Pattern Recognition, Oct. 2008, 14 pages.
Liebowitz,"Creating Architectural Models from Images", In Eurographics, vol. 18, 1999, 13 pages.
Liu,"Expressive Expression Mapping with Ratio Images", Bibliometrics Data Bibliometrics, Aug. 2001, 6 pages.
Oh,"Image-Based Modeling and Photo Editing", 28th annual conference on Computer graphics and interactive techniques, SIGGRAPH Proceedings, 2001, 10 pages.
Ostrovsky,"Perceiving illumination inconsistencies in scenes", Perception, 2005, vol. 34, 2005, 15 pages.
Perez,"Poisson Image Editing", ACM Trans. Graph., vol. 22, Jul. 2003, pp. 313-318.
Prasad,"Single View Reconstruction of Curved Surfaces", 2006, 8 pages.
Rother,""GrabCut"—Interactive Foreground Extraction using Iterated Graph Cuts", ACM SIGGRAPH 2004, Aug. 2004, 6 pages.
Sinha,"Interactive 3D Architectural Modeling from Unordered Photo Collections", ACM Transactions on Graphics, vol. 27, No. 5, Article 159, Dec. 2008, pp. 159:1-159:10.
Tappen,"Estimating Intrinsic Component Images using Non-Linear Regression", In CVPR, vol. 2, 2006, 8 pages.
Tappen,"Recovering Intrinsic Images from a Single Image", IEEE Trans. PAMI 27, 9, Sep. 2005, 8 pages.
Weiss,"Deriving Intrinsic Images from Image Sequences", In ICCV, II, 2001, 8 pages.
Wen,"Face Relighting with Radiance Environment Maps", Proceedings of the 2003 IEEE Computer Society Conference on Computer Vision and Pattern Recognition (CVPR'03), 2003., 2003, 8 pages.
White,"Retexturing Single Views Using Texture and Shading", Technical Report No. UCB/EECS-2005-4 http://www.eecs.berkeley.edu/Pubs/TechRpts/2005/EECS-2005-4.html, Oct. 3, 2005, 15 pages.
Xia,"Patch-Based Image Vectorization with Automatic Curvilinear Feature Alignment", Appears in ACM Transactions on Graphics (special issue for SIGGRAPH Asia 2009), Dec. 2009, 10 pages.
Zhang,"Shape from Shading: a Survey", IEEE Transactions on Pattern Analysis and Machine Intelligence, vol. 21, No. 8, Aug. 1999, 17 pages.
Zhang,"Single View Modeling of Free-Form Scenes", Journal of Visualization and Computer Animation, vol. 13, No. 4, 2002, 9 pages.

* cited by examiner

RELIGHTING FRAGMENTS FOR INSERTION INTO CONTENT

GOVERNMENT LICENSE

This invention was made with government support under contract numbers 0904209 awarded by the National Science Foundation and contract number 0916014 awarded by the National Science Foundation and N00014-10-1-0934 awarded by the Office of Naval Research and N00014-01-1-0890 awarded by the Office of Naval Research. The government has certain rights in the invention.

BACKGROUND

As computing devices have become more powerful and commonplace, users increasingly view and manipulate photographs on their computers. One type of manipulation that is of interest to users is inserting fragments of one image into another. Although a fragment can be inserted into an image by simply pasting or adding the object into the image, such techniques typically result in the fragment that was added looking out of place. Accordingly, it remains difficult for users to insert fragments of images into other images and obtain a result that appears realistic, as if the inserted fragment were actually part of the scene into which it is inserted.

SUMMARY

This Summary is provided to introduce subject matter that is further described below in the Detailed Description. Accordingly, the Summary should not be considered to describe essential features nor used to limit the scope of the claimed subject matter.

In accordance with one or more aspects, a fragment model for a fragment is obtained and a target scene model for a target scene is obtained. Based on the fragment model, a set of multiple detail maps for the fragment are generated. The fragment model is inserted into the target scene model, and the target scene model with the inserted fragment model is rendered to generate a rendered scene. A composited target scene is generated, and a modified target scene is also generated by combining the composited target scene and the set of multiple detail maps.

BRIEF DESCRIPTION OF THE DRAWINGS

Non-limiting and non-exhaustive embodiments are described with reference to the following figures, wherein like reference numerals refer to like parts throughout the various views unless otherwise specified.

DETAILED DESCRIPTION

Relighting fragments for insertion into content is discussed herein. A fragment model is obtained for a fragment to be inserted into a target scene. A set of detail maps for the fragment model are generated, each of which encodes fine-scale shading effects from the surface detail of the fragment. A target scene model is obtained for the target scene, and the fragment model is inserted into the target scene model. The target scene model with inserted fragment model is rendered, and a composited target scene is generated based at least in part on the rendered scene, the target scene, and an object mask. A modified target scene is generated by combining the composited target scene and the set of detail maps. Weights assigned to the different detail maps can be changed by the user, allowing the modified target scene to be readily altered without re-rendering the target scene model with the inserted fragment model.

Figure 1:
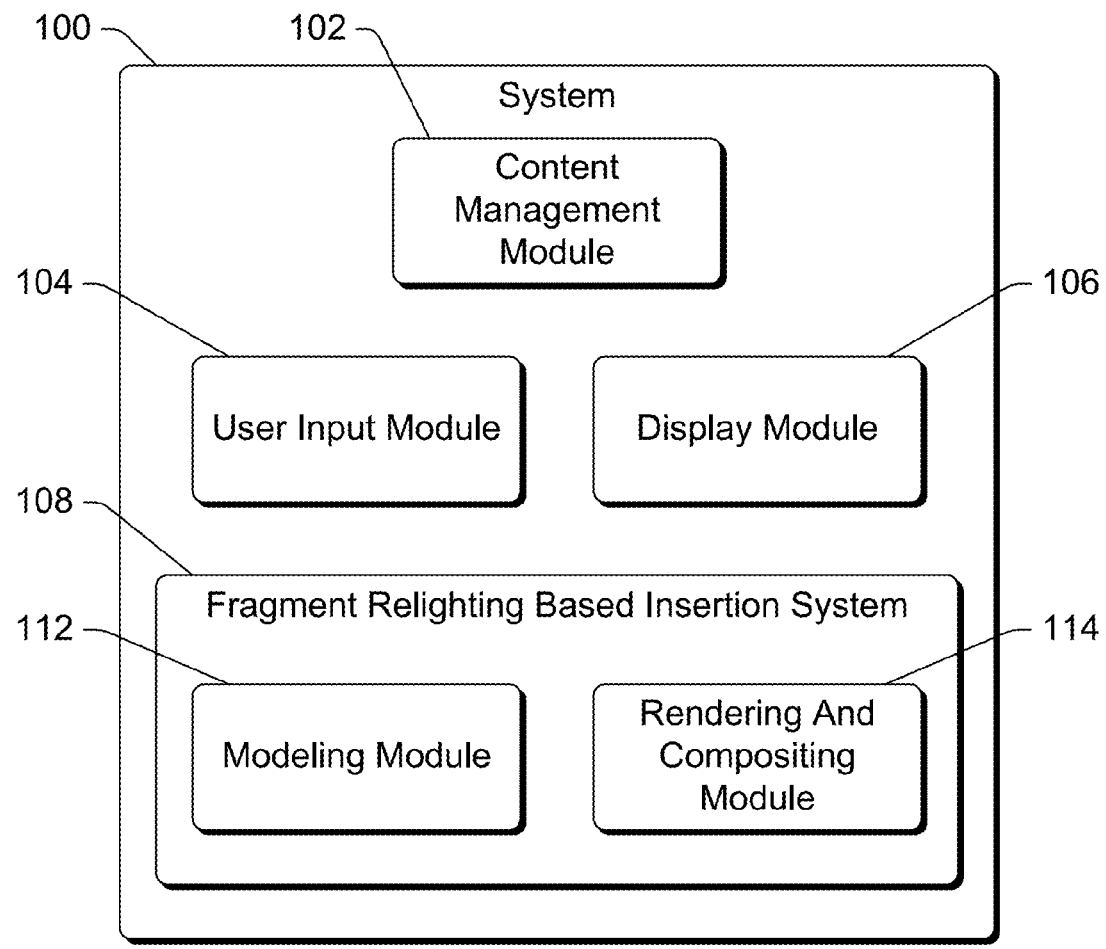
FIG. 1 illustrates an example system implementing the relighting fragments for insertion into content in accordance with one or more embodiments.

FIG. 1 illustrates an example system 100 implementing the relighting fragments for insertion into content in accordance with one or more embodiments. System 100 includes a content management module 102, a user input module 104, a display module 106, and an image fragment relighting based insertion system 108. Insertion system 108 includes a modeling module 112 and a rendering and compositing module 114. Although particular modules are illustrated in FIG. 1, it should be noted that functionality of one or more modules can be separated into multiple modules, and/or that functionality of one or more modules can be combined into a single module.

In one or more embodiments, system 100 is implemented by a single device. Any of a variety of different types of devices can be used to implement system 100, such as a desktop or laptop computer, a tablet or notepad computer, a server computer, a cellular or other wireless phone, a digital camera, a gaming system, and so forth. Alternatively, system 100 can be implemented by multiple devices, with different devices including different modules. For example, one or more modules of system 100 can be implemented at least in part by one device (e.g., a desktop computer), while one or more other modules of system 100 are implemented at least in part by another device (e.g., a server computer accessed over a communication network). In embodiments in which system 100 is implemented by multiple devices, the multiple devices can communicate with one another over various wired and/or wireless communication networks (e.g., the Internet, a local area network (LAN), a cellular or other wireless phone network, etc.) or other communication media (e.g., a universal serial bus (USB) connection, a wireless USB connection, and so forth).

Content management module 102 manages content, including obtaining content and/or providing content to other devices or systems. The content can be in various forms, such as a single image, a set of multiple images (e.g., video), and so forth. An image refers to any visual content, such as a photograph, a painting, a sketch, a drawing, and so forth. Images can be captured by an image capture device (e.g., a camera capturing a photo, a scanner capturing a hand-drawn sketch, etc.) and/or generated in other manners such as by using a computer aided drawing program. Content management module 102 can obtain content in various manners, such as from an image capture device of system 100, from another system or device, from a storage device (e.g., magnetic disk, optical disc, Flash memory, etc.) of system 100, and so forth. Content management module 102 can also provide content to other devices or systems in various manners, such as emailing content, saving content in a particular location of a storage device or to a particular service, and so forth.

User input module 104 receives inputs from a user of system 100, and provides an indication of those user inputs to various modules of system 100. User inputs can be provided by the user in various manners, such as by touching portions of a touchscreen or touchpad with a finger or stylus, pressing keys or buttons (e.g., on a keyboard), manipulating a mouse or other cursor control device, providing audible inputs that are received by a microphone of system 100, moving hands or other body parts that are detected by an image capture device of system 100, and so forth.

Display module 106 displays a user interface (UI) for system 100, including displaying images or other content. Display module 106 can display the UI on a screen of system 100, or alternatively provide signals causing the UI to be displayed on a screen of another system or device.

Fragment relighting based insertion system 108 facilitates inserting fragments into content. A fragment refers to at least a portion or piece of an image, which can be any visual content. Fragments can be captured by an image capture device (e.g., a camera capturing a photo, a scanner capturing a hand-drawn sketch, a video camera capturing multiple images or frames of video, etc.) and/or generated in other manners such as by using a computer aided drawing program. Fragments can take various forms, such as particular objects or portions of objects from an image. For example, a fragment from an image may include a teacup in the image, a person in the image, a hot air balloon in the image, and so forth. A fragment is oftentimes a portion of an image, but can alternatively be an entire image. For example, an image may include only a hot air balloon, and the entire image can be a fragment. A fragment can also be generated or otherwise obtained in other manners, such as generated using a drawing or editing program, generated using a modeling program, and so forth. These fragments are typically identified by a user of system 100, but can alternatively be identified in other manners (e.g., by another module of system 100, by another device or system, etc.).

Generally, content management module 102 obtains content and fragments, and makes the content and fragments available to fragment relighting based insertion system 108. The obtained content is an image that includes a target scene. Modeling module 112 generates a model of the fragment, including an approximate shape of the fragment, an albedo map for the fragment, and a set of one or more shading detail maps for the fragment. Rendering module 114 uses a model of the target scene as well as the model of the fragment generated by modeling module 112 to render the fragment in the scene of the content and compute a gross shading map for the fragment that contains coarse-scale, directional shading effects. Rendering and compositing module 114 also composites the rendering to generate modified content. The modified content is the content that was obtained and modified by insertion of the one or more fragments. In the modified content, the inserted fragments look like they belong in the content, appearing as if the fragments were actually part of the target scene.

The manner in which a fragment is inserted into a target scene is discussed in additional detail below. It should be noted that the process of inserting a fragment can be repeated one or more times, allowing multiple fragments to be inserted into the same target scene.

Figure 2:
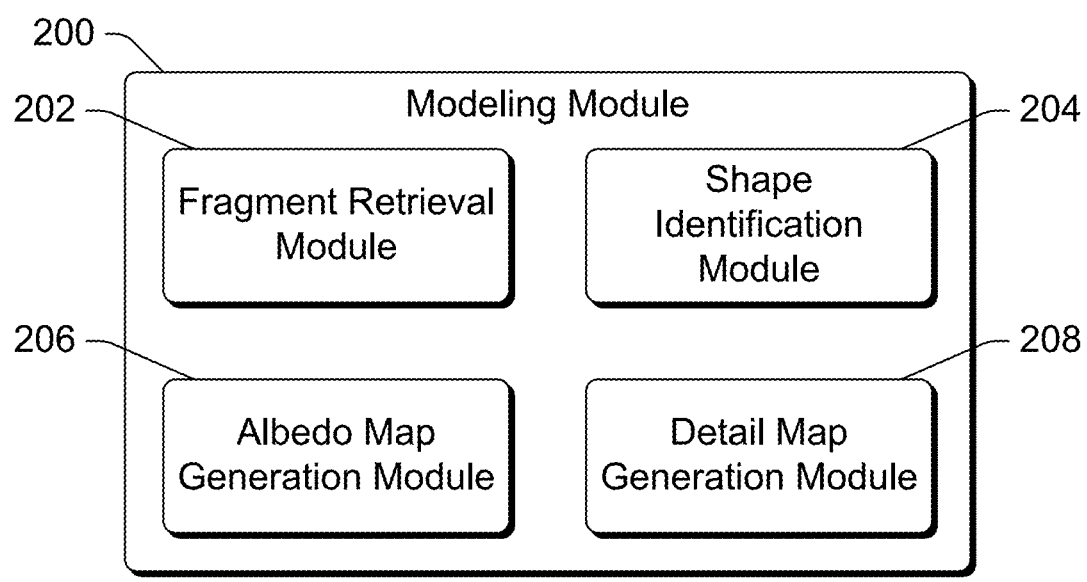
FIG. 2 illustrates an example modeling module in accordance with one or more embodiments.

FIG. 2 illustrates an example modeling module 200 in accordance with one or more embodiments. Modeling module 200 can be, for example, a modeling module 112 of FIG. 1. Modeling module 200 includes a fragment retrieval module 202, a shape identification module 204, an albedo map generation module 206, and a detail map generation module 208. Fragment retrieval module 202 obtains or otherwise retrieves a fragment from an image. This retrieval can be performed using various techniques, such as interactive segmentation or matting techniques, as discussed below. Shape identification module 204 generates a shape model for the fragment that indicates an approximate shape of the fragment. Albedo map generation module 206 generates an albedo map for the fragment that indicates an approximate albedo for the fragment. Detail map generation module 208 generates a set of one or more shading detail maps for the fragment. These shading detail maps encode fine-scale shading effects from surface detail, as discussed in more detail below.

Figure 3:
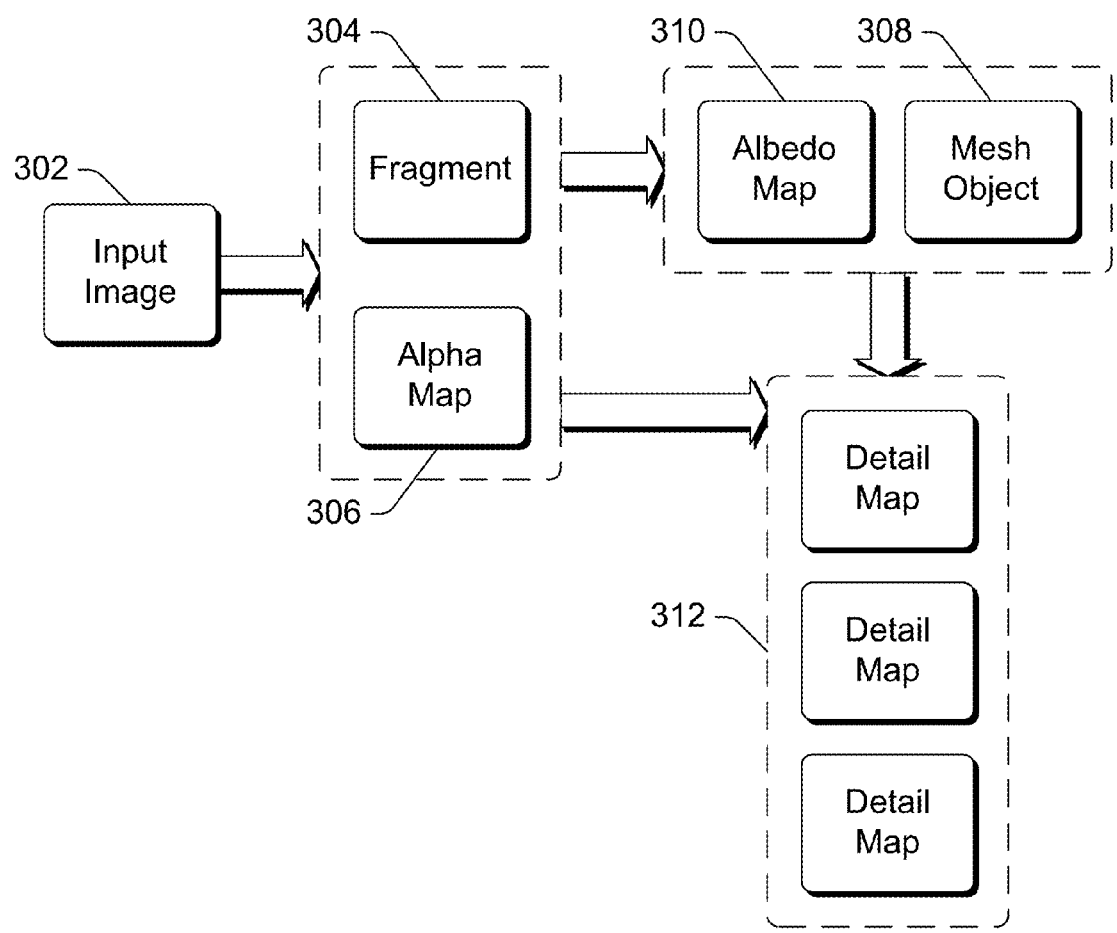
FIG. 3 illustrates an example data flow for generating a model of a fragment and a set of one or more shading detail maps for the fragment in accordance with one or more embodiments.

FIG. 3 illustrates an example data flow 300 for generating a model of a fragment and a set of one or more shading detail maps for the fragment in accordance with one or more embodiments. Data flow 300 is implemented by, for example, modeling module 200 of FIG. 2. An input image 302 including a fragment is obtained. The fragment 304 and an alpha map 306 for the fragment are obtained from the input image. A mesh object 308 is generated, from the fragment 304, as a shape model of the fragment. An albedo map 310 is also generated from the fragment 304. The fragment model for the fragment 304 includes alpha map 306, mesh object 308, and albedo map 310.

A set of detail maps 312 are also generated based on the fragment 304 and the albedo map 310. Detail maps 312 include one or more detail maps, and typically include two or more detail maps. In one or more embodiments, three different detail maps are generated, although any number of detail maps can alternatively be generated.

Returning to FIG. 2, fragment retrieval module 202 obtains or otherwise retrieves a fragment from an input image. This input image is a different image than the image that includes the target scene into which the fragment is to be inserted. Module 202 can use any of a variety of publicly available and/or proprietary techniques to retrieve the fragment. In one or more embodiments, module 202 uses an interactive segmentation or matting technique to obtain from the input image both the fragment and an alpha map for the fragment. This alpha map is included as part of the fragment model used for rendering and compositing, as discussed in more detail below.

Various different interactive segmentation and/or matting techniques can be used by module 202, such as the Grab-cut technique discussed in "'Grab-cut': interactive foreground extraction using iterated graph cuts", by C. Rother, V. Kolmogorov, and A. Blake, SIGGRAPH '04, pp. 309-314 (2004). Various other interactive segmentation and/or matting techniques can alternatively be used by module 202, such as the techniques discussed in: "A closed form solution to natural image matting", by A. Levin, D. Lischinski, and Y. Weiss, in 2006 IEEE Computer Society Conference on Computer Vision and Pattern Recognition, vol. 1, pp. 61-68

(2006); "Spectral matting", by A. Levin, A. Rav-Acaha, and D. Lischinski, in IEEE Conference on Computer Vision and Pattern Recognition, pp. 1-8 (2007); and/or "Category independent object proposal" by I. Endres and D. Hoiem, in Proceedings of the 11$^{th}$ European conference on Computer vision, Part V, pp. 575-588 (2010).

Shape identification module 204 generates a shape model for the fragment that indicates an approximate shape of the fragment. In one or more embodiments, this shape model is a sparse mesh object representing the fragment, although other types of shape models can alternatively be used and shape models can alternatively be generated in other manners. Module 204 assumes that the fragment in the input was viewed in an orthographic camera, and that the boundary of the fragment is an outline. Given these assumptions, the normals on the fragment boundary are perpendicular to the fragment boundary and parallel to the image plane.

Shape identification module 204 generates the shape model using any of a variety of different publicly available and/or proprietary boundary or contour detection techniques. In one or more embodiments, module 204 uses a shape from contour method as discussed in "Single view reconstruction of curved surfaces" by M. Prasad, A. Zisserman, and A. W. Fitzgibbon, in CVPR 2006 (2006). Module 204 creates a surface, also referred to as a reconstructed fragment, from which the shape model is generated using the shape from contour method.

A reconstructed fragment is created by interpolating normals from the boundary to the interior using a smoothness assumption. Various different smoothness assumptions can be used, such as the Lumo technique discussed in "Lumo: illumination for cell animation", S. F. Johnston, in NPAR 2002 (2002). In one or more embodiments, a normal field N is estimated for the fragment. The normal field N is determined by solving the following optimization problem:

$$\operatorname*{argmin}_{N} \sum_{i \in \Omega} (\nabla N_i)^2 + \alpha (\|N_i\| - 1)^2 \qquad (1)$$

$$N_i = \nabla M_i \ \forall \ i \in \partial\Omega$$

where M refers to a segmentation mask of the fragment (e.g., having a value of 1 for pixels inside the fragment and a value of 0 for pixels outside the fragment), $\partial\Omega$ refers to the set of pixels that make up the boundary of the fragment, $\Omega$ refers to the pixels that make up the fragment, and $\alpha$ is a constant. The value of $\alpha$ is 5 in some embodiments, although other values of $\alpha$ may be used.

In the optimization problem (1), the first term $(\nabla N_i)^2$ enforces spatial smoothness in N, and the second term $\alpha(\|N_i\|-1)^2$ is a soft constraint encouraging the normal to be unit vectors.

After solving the optimization problem (1), a final normal field is obtained by normalizing N. Any of a variety of publicly available and/or proprietary normalization techniques can be used to normalize N. It should be noted that integratability constraints on the normal field N need not be imposed.

The module 204 then reconstructs a height field for the fragment. A height field h is generated by solving the following operation:

$$\min \int \left\| \left(\frac{\partial h}{\partial x}\right) - N_{ix} \right\|^2 + \left\| \left(\frac{\partial h}{\partial y}\right) - N_{iy} \right\|^2 dA$$

$h(x)=0 \ \forall x \in$ fragment boundary
where x and y refer to 2-dimensional (2D) coordinates of the pixels in an area A of the fragment.

The contour of the fragment is constrained to lie on a frontal. This constraint results in the reconstruction of the fragment at the boundary of the fragment being flattened, reducing the gradient of the reconstructed fragment and forcing the reconstructed fragment to have a crease along its boundary. This crease can be leveraged in contour generation, causing the contour generator in the shape from contour method to stick or adhere to the crease for small moves of the viewpoint.

Given the contour and the height field h, a mesh object for the fragment is generated. A mesh object can be generated using any of a variety of publicly available and/or proprietary techniques. This mesh object is included as part of the fragment model used for rendering and compositing, as discussed in more detail below.

In one or more embodiments, module 204 generates an initial dense triangular mesh using the vector-based representation technique discussed in "Patch-based image vectorization with automatic curvilinear feature alignment" by T. Xia, B. Liao, and Y. Yu, ACM Trans. Graph. 28, 5, 1-10 (209). The triangular mesh is constructed from the height field h, with each pixel in the fragment corresponding to a vertex with coordinate (x, y, height). The triangular mesh is simplified to a desired size. This desired size can vary by implementation based on the desires of the designer of module 204. For example, the triangular mesh can be simplified to a size so that the vertex count in the triangular mesh is 0.05 to 0.1 times the pixel count in the fragment. The simplification process adaptively allocates fewer vertices in smooth regions and more vertices in other regions. The simplification process also facilitates an accurate approximation (e.g., within one-pixel error) of the object contour by using Bezier curve fitting and error checking before edge contraction operations on the object contour. After the simplification process is performed, each vertex is associated with a UV coordinate from its image domain coordinate (x, y) and normal value from the normal field N discussed above.

Albedo map generation module 206 generates an albedo map for the fragment that indicates an approximate albedo for the fragment. The albedo map facilitates rendering of the fragment in the final image, and is included as part of the fragment model used for rendering and compositing, as discussed in more detail below. The albedo map generated by module 206 is an estimate of the albedo of the fragment.

The albedo map can be generated in different manners. In one or more embodiments, module 206 generates the albedo for the fragment using a ColorRetinex thresholding scheme as discussed in "Ground-truth dataset and baseline evaluations for intrinsic image algorithms" by R. Grosse, M. K. Johnson, E. H. Adelson, and W. T. Freeman in International Conference on Computer Vision, pp. 2335-2341 (2009). With the ColorRetinex thresholding scheme, the color threshold is set to 0.3 and the intensity threshold is set to 1.0, although other values can alternatively be used.

Using the ColorRetinex thresholding scheme, the albedo of the fragment is estimated from the log intensity by obtaining $\rho$ that minimizes the following operation:

$$\min \int \|\nabla \log \rho - T(\nabla \log I)\|^2 dA \qquad (2)$$

and then choosing a constant of integration, where $\rho$ refers to the albedo for pixels of the fragment, T refers to a function that sets small magnitude arguments to zero and reproduces large magnitude arguments, and I refers to the image intensity of pixels of the fragment. Small magnitude arguments refer to arguments that are less than and/or equal to a threshold value (e.g. 0.075) and large magnitude arguments refer to arguments that are greater than and/or equal to the threshold value (e.g., gradients (in log space) less than the threshold value are small magnitude arguments, and gradients equal to or greater than the threshold value are large magnitude arguments). It should be noted that module 206 need impose no constraints on shading in generating the albedo map.

Albedo map generation module 206 also compels a shading field to be smooth, and the residual (log I–log S–log ρ) to be small, which leads to minimizing the following operation:

$$\min \int \|\nabla \log \rho - T(\nabla \log I)\|^2 dA + \lambda_1 \int \|(\nabla \log S)\|^2 dA + \lambda_2 \int \|\log I - \log S - \log \rho\|^2 dA \quad (3)$$

where S refers to the shading for pixels of the fragment. The operation (3) couples the estimation of shading to albedo, while allowing a small residual (the third term of operation (3)).

Alternatively, the albedo map can be generated in other manners, including automatic and/or user interactive techniques. For example, module 206 can generate the albedo for the fragment using the interactive albedo estimation procedures discussed in "Illumination decomposition for material recoloring with consistent interreflections" by R. Carroll, R. Ramamoorthi, and M. Agrawala, in ACM SIGGRAPH 2011 papers, SIGGRAPH '11, pp. 43:1-43:10 (2011).

Detail map generation module 208 generates, based on the albedo map generated by module 206, a set of one or more shading detail maps for the fragment. These shading detail maps encode fine-scale shading effects from surface detail. Detail map generation module 208 generates multiple detail maps D, each of which refers to a shading detail map for pixels of the fragment. Module 208 uses multiple different illumination techniques to generate the different detail maps, resulting in the different detail maps having different layers or levels of detail. Different weights can be assigned to these detail maps by a user during compositing of the fragment and the content as discussed in more detail below.

The different illumination techniques used to generate the detail maps vary based on the manner in which the illumination field L on the fragment is estimated. In one or more embodiments, the illumination field is estimated as a uniform illumination that assumes each point on the fragment receives the same irradiance. A uniform illumination detail map $D_u$ is generated as follows:

$$D_u = I - k\rho \quad (4)$$

where k refers to the value of irradiance. In one or more embodiments, the value of irradiance k is selected so that the largest values of I and of kρ are the same.

In one or more embodiments, the illumination field is estimated to be a parametric source L(θ) and a direction θ̂ of a light source is determined by solving the following optimization problem:

$$\hat{\theta} \underset{\theta}{\operatorname{argmin}} \int \|I - \rho \cdot \text{Shade}(\text{fragment shape}, L(\theta))\|^2 dA \quad (5)$$

where θ refers to the direction of the light source, and Shade (fragment shape, L(θ)) refers to a diffuse lighting calculation (e.g., the inner product of the normal vectors defined by the shape and the direction of the light source defined by L(θ)). A parametric detail map $D_p$ is then generated as follows:

$$D_p = I - \rho \cdot \text{Shade}(\text{fragment shape}, L(\hat{\theta})) \quad (6)$$

In one or more embodiments, the ColorRetinex thresholding scheme used by albedo map generation module 206 reports an inferred illumination field S. Module 208 leverages the inferred illumination field S, and generates an inferred illumination detail map $D_i$ as follows:

$$D_i = I - \rho S \quad (7)$$

It should be noted that modeling module 200 can also provide various additional functionality to support the relighting fragments for insertion into content techniques discussed herein. In one or more embodiments modeling module 200 provides functionality allowing the material properties of the pixels of the fragments to be changed and/or the material properties of the fragment model to be changed. These material properties can be changed automatically and/or based on user inputs. Various different techniques can be used to change these material properties, such as the material-based image editing techniques discussed in "Image-based material editing" by E. A. Kahn, E. Reinhard, R. W. Fleming, and H. H. Bülthoff, in ACM SIGGRAPH 2006 papers, pp. 654-663 (2006).

Various additional modifications to the fragment model can also be made by the user. These additional modifications can be made by modeling module 200 and/or other modules or components. For example, the surface properties of the fragment model can be readily modified to make the object appear glossy, refractive, and so forth. These surface properties can be modified in any of a variety of conventional manners and/or using any of a variety of conventional modeling applications.

Figure 4:
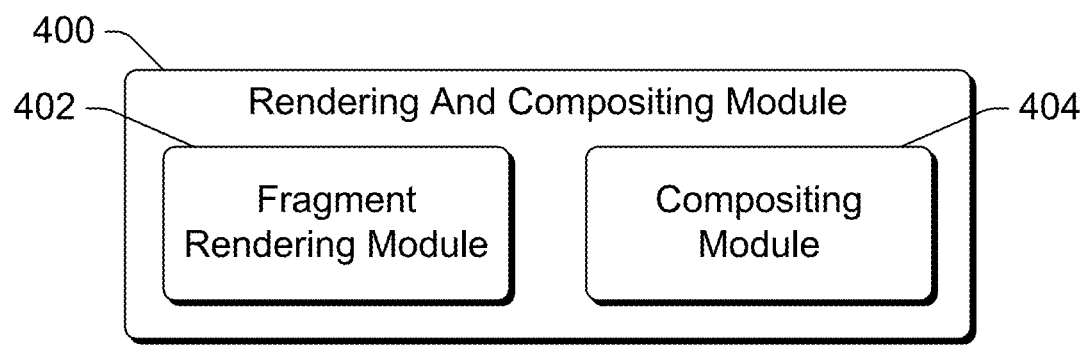
FIG. 4 illustrates an example rendering and compositing module in accordance with one or more embodiments.

FIG. 4 illustrates an example rendering and compositing module 400 in accordance with one or more embodiments. Module 400 can be, for example, a rendering and compositing module 114 of FIG. 1. Module 400 includes a fragment rendering module 402 and a compositing module 404 that generate modified images. The modified image is the image that includes the target scene into which the one or more fragments are inserted. Fragment rendering module 402 receives the alpha map generated by fragment retrieval module 202 of FIG. 2, the mesh object generated by shape identification module 204 of FIG. 2, and the albedo map generated by albedo map generation module 206. Module 402 generates, based on the target scene in the image as well as the received alpha map, mesh object, and albedo map, a rendered scene. The rendered scene includes the target scene as well as the fragment. Compositing module 404 generates the modified image based on the rendered scene, the target scene, and the detail maps generated by detail map generation module 208 of FIG. 2.

Figure 5:
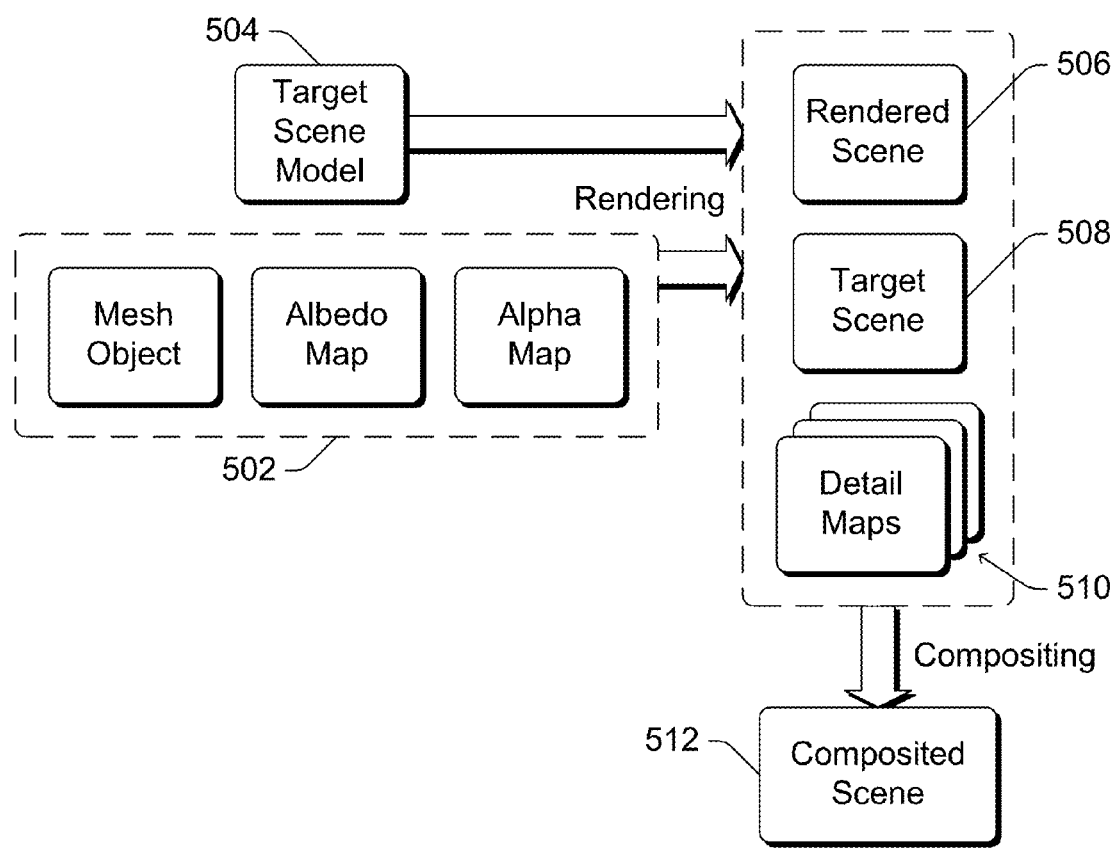
FIG. 5 illustrates an example data flow for rendering and compositing to generate modified images in accordance with one or more embodiments.

FIG. 5 illustrates an example data flow 500 for rendering and compositing to generate modified images in accordance with one or more embodiments. Data flow 500 is implemented by, for example, rendering and compositing module 400 of FIG. 4. A fragment model 502 is obtained, including a mesh object, an albedo map, and an alpha map. A target scene model 504 is also obtained, which is a model of the target scene to which the fragment object is to be added. The fragment model 502 is added to the target scene model 504 and rendered to generate a rendered scene 506. The rendered scene 506 and target scene 508 (the content to which the fragment object is being added) are composited to generate a composited scene 512. Weights can also be assigned to each detail map 510 (the detail maps generated by detail map generation module 208 as discussed above), and changed in response to user input to alter the composited scene 512 and create the final composited image. This final composited image is the modified image (the target scene with the fragment added thereto).

Returning to FIG. 4, fragment rendering module 402 generates a rendered scene. The rendered scene is the target scene including the fragment inserted into the target scene. The location of the fragment in the target scene is provided to module 402, typically as a user input but alternatively from another module, component, and/or device.

Fragment rendering module 402 obtains a scene model for the target scene. The scene model identifies various aspects of the target scene, including light transfer, shadowing, and so forth. The scene model can be generated by another component or module, or alternatively by module 402 using any of a variety of different publicly available and/or proprietary techniques. The scene model can take various forms, such as a ground plane and a point source, a 3-dimensional (3D) representation of the target scene generated based on automatically identified boundaries within the scene, and so forth. In one or more embodiments, the target scene is generated using the techniques discussed in "Rendering synthetic objects into legacy photographs" by K. Karsch, V. Hedau, D. Forsyth, and D. Hoiem, in Proceedings of the 2011 SIGGRAPH Asia Conference, pp. 1-12 (2011) and/or in "Recovering the spatial layout of cluttered rooms" by V. Hedau, D. Hoiem, and D. Forsyth, in ICCV, pp. 1849-1856 (2009).

Fragment rendering module 402 receives an indication (e.g., a user input) of the location where the fragment model for the fragment (as generated by modeling module 112 of FIG. 1 or modeling module 200 of FIG. 2 as discussed above) is to be inserted into the scene model. This indication can be received in various manners, such as by a user dragging and dropping the fragment at the desired location in the scene model using a graphical user interface (GUI), the user inputting an indication of coordinates of the desired location in the scene model, and so forth. Module 402 can also receive indications (e.g., user inputs) of adjustments to the fragment, such as adjustments to the orientation of the fragment, adjustments to the scale of the fragment, adjusts to the view angle of the fragment, and so forth.

Fragment rendering module 402 can allow the user to input the indication of the location where the fragment model is to be inserted into the scene model using any of a variety of publicly available and/or proprietary techniques. In one or more embodiments, module 402 uses the Blender content creation suite (available at the web site "blender-.org") to allow the user to place the fragment model at the location and with the adjustments he or she desires.

Given the location and any adjustments to the fragment, module 402 renders the scene model including the fragment model to generate the rendered scene. The fragment model is rendered with the albedo identified in the albedo map of the fragment model, and optionally the alpha map of the fragment model as the transparency coefficient.

In one or more embodiments, prior to rendering, module 402 performs heightfield easing and back extrusion on the fragment model. The mesh object was constructed assuming an orthographic camera as discussed above. In the mesh object's coordinate system, the source camera views the model along the z-axis. However, when the fragment model is placed, the view is likely to be perspective, with a focal point at fin the fragment model's coordinate system. The focal point f is assumed to be both far from the camera and predominately frontal. Accordingly, module 402 uses an easing method to avoid self-occlusion and improve the texture field.

The easing method used by module 402 for heightfield easing refers to a value $x_m=(x,y,h)$ that represents a vertex on the mesh object, where x and y refer to coordinates of the vertex on the mesh object and h refers to the height of the vertex on the mesh object. The easing method used by module 402 also refers to a value $x_f=(x,y,0)$ that represents the coordinates of the vertex in the fragment plane. Module 402 replaces $x_m=(x,y,h)$ with the following:

$$x_f + h * \frac{(f - x_f)}{\|(f - x_f)\|} \tag{8}$$

With this replacement, if the camera is orthographic, there is no change in vertex position, and for cameras that are very distant along the z-axis compared to the x and y axes, the shift is small.

With respect to the back extrusion performed by module 402, the mesh object is constructed as discussed above by lifting the mesh for a 2D plane to an estimated height field, which leaves the back of the mesh object empty. This can result in various issues, such as skinny lateral shadows and light leaking at the bottom of the fragment model. To alleviate this situation, module 402 extrudes the back of the mesh object. To extrude the back of the fragment model, the mesh object is flipped along its contour plane so that the back of the mesh object is displayed, and a user input indicating a distance to extrude the back of the mesh object is received. This distance is sufficient to ensure full (or nearly full) contact of the mesh object bottom with the supporting surface. The user input can indicate the distance in a variety of different manners, such as by dragging and dropping a line or portion of the model in a GUI, providing a numerical indicator, and so forth. The fragment model is then flipped again along its contour plane, and the extruded back is eased in the camera direction to reduce its visibility.

This easing of the extruded back is performed analogous to the easing discussed above, using equation (8) with the value $x_m$ representing a vertex in the extruded back (the portion of the fragment model that is extruded) of the mesh object. However, for the easing of the extruded back, the extruded back is in the direction away from the camera rather than pointing towards the camera as in the heightfield easing.

After performing the heightfield easing and back extrusion on the mesh object, which results in a modified fragment model, module 402 renders the modified fragment model. The modified fragment model is rendered in the target scene using any of a variety of publicly available and/or proprietary techniques, resulting in a rendered scene. In one or more embodiments, the modified fragment model is rendered in the target scene using the LuxRender renderer (available at the web site "luxrender.net"). The shadowing, light transfer, and so forth interactions between the fragment and the scene are accounted for by the renderer, which is thus also referred to as computing and using a gross shading map for the fragment (as well as for the target scene).

Compositing module 404 generates the modified image (also referred to as the modified target scene) based on the rendered scene, the target scene, and the detail maps generated by detail map generation module 208 of FIG. 2. Module 404 generates the modified image by compositing the rendered scene back into the target scene, then applying the detail in the detail maps. The rendered scene can be composited back into the target scene using various publicly available and/or proprietary techniques, such as using the additive differential rendering method discussed in "Rendering synthetic objects into real scenes: bridging traditional and image-based graphics with global illumination and high dynamic range photography", by Debevec, P. E., in SIGGRAPH 98 (1998). This additive differential rendering method generates a composite image C as follows:

$$C = M \odot R + (1-M) \odot (I+R-E) \qquad (9)$$

where R refers to a rendered target scene including inserted fragments, E refers to the rendered target scene without inserted fragments, I refers to the target scene, M refers to an object mask (a scalar image that is 0 everywhere where no object (e.g., no fragment) is present, and (0, 1] otherwise), and $\odot$ is the Hadamard product. The composite image C incorporates the interplay between the target scene and the fragment, including shadows, caustics, and so forth. The composite image C thus incorporates the gross shading map discussed above.

Different detail maps are generated by the modeling module as discussed above: a uniform illumination detail map $D_u$, a parametric detail map $D_p$, and an inferred illumination detail map $D_i$. Each detail map encodes different attributes of the surface. Typically, the uniform illumination detail map $D_u$ contains low-frequency (yet possibly large) details, the inferred illumination detail map $D_i$ contains only small-scale, high-frequency detail, and the parametric detail map $D_p$ captures detail that may be lost in the other two detail maps. These detail maps are applied to the rendered target scene by generating a final composite image $C_{final}$ as follows:

$$C_{final} = C + w_u D_u^{\gamma_u} + w_p D_p^{\gamma_p} + w_i D_i^{\gamma_i} \qquad (10)$$

where $w_{\{u,p,i\}}$ and $\gamma_{\{u,p,i\}}$ are user defined weights that control the influence of each detail layer respectively. The w weights are coefficients applied to the detail maps, each of which can be a positive value, a negative value, or zero. The γ weights are gamma values applied to the detail maps, each of which can be zero or more. Each detail map has a corresponding map weight, which includes both the w weight and the γ weight.

In the discussions herein, the detail map weights are discussed as including both the w weight and the γ weight. Alternatively, the detail map weights for one or more detail layers may include the w weight or the γ weight, but not both.

In one or more embodiments, a user interface (e.g., GUI) is presented to the user, allowing the user to provide inputs to alter the weights $w_{\{u,p,i\}}$ and $\gamma_{\{u,p,i\}}$. The user interface can allow altering of the weights in various manners, such as graphical sliders allowing weights to be increased and/or decreased, user inputs of specific weight values, up/down arrows to increase/decrease weights, and so forth.

Figure 6:
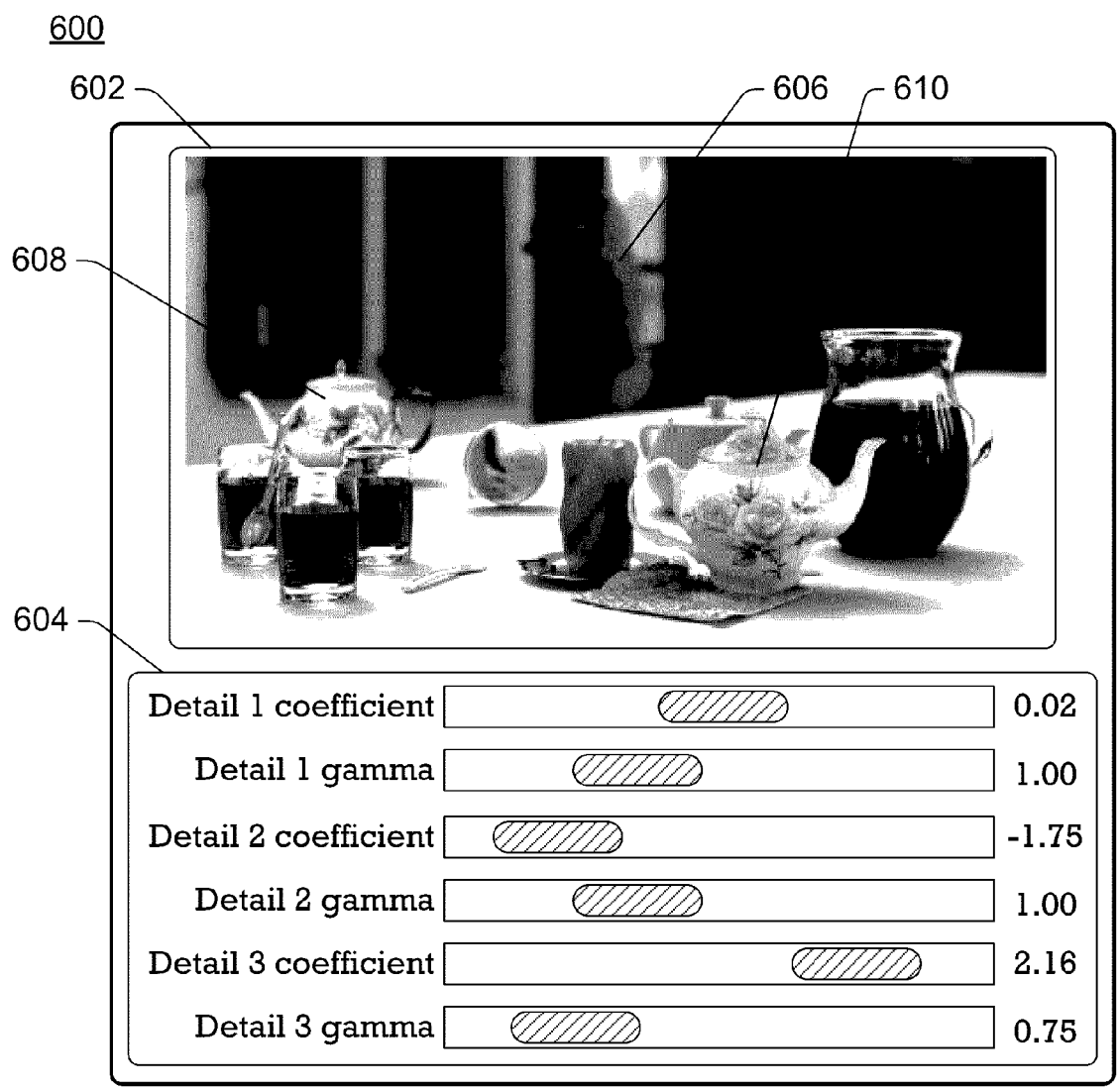
FIG. 6 illustrates an example user interface allowing a user to adjust weights for the various detail layers in accordance with one or more embodiments.

FIG. 6 illustrates an example user interface 600 allowing a user to adjust weights for the various detail layers in accordance with one or more embodiments. User interface 600 includes a display portion 602 and a detail adjustment portion 604. Display portion 602 displays a composite image, which is the target scene modified to include the fragment. In the illustrated example of FIG. 6, three fragments are inserted into the target scene: an ostrich 606, and teapots 608 and 610.

Detail adjust portion 604 includes graphical sliders for each of three different detail maps, listed as "Detail 1", "Detail 2", and "Detail 3". Each of these detail maps corresponds to one of the detail maps D, such as the uniform illumination detail map, the inferred illumination detail map, and the parametric detail map, respectively. The user can slide the corresponding slider to adjust the coefficient weight w for the corresponding detail map. For example, the user can move the slider adjacent to the "Detail 1 coefficient" label to the right to increase the value of the coefficient weight w corresponding to detail map "Detail 3", and to the left to decrease the value of the coefficient weight w corresponding to detail map "Detail 3". By way of another example, the user can move the slider adjacent to the "Detail 2 gamma" label to the right to increase the value of the gamma weight γ corresponding to detail map "Detail 2", and to the left to decrease the value of the gamma weight γ corresponding to detail map "Detail 2".

The current coefficient and gamma weights corresponding to each detail map are also illustrated to the right of the corresponding slider. For example, the current weight for the coefficient weight w corresponding to detail map "Detail 3" is "2.16". As the user adjusts the map weights, rendering and compositing module 400 re-generates the composite image per equation (10) above, without re-rendering the fragment model and target scene model. An "accept" or "finalize" option can optionally be selected by the user (e.g., a button, menu item, key sequence, etc.) to indicate that changes to the detail map weights have been completed, and that the final detail map weighting applied to the composite image has been entered.

In situations in which the user is inserting multiple fragments into the target scene, the user can select a particular one of those multiple fragments and adjust the map weights for that one fragment. The one fragment can be selected in different manners, such as by the user clicking on or touching the fragment, selection of a menu item, and so forth. Thus, the map weights for the different detail maps of each fragment can be adjusted separately. Alternatively, the map weights can be adjusted for two or more (e.g., all) of the fragments concurrently. In such situations, as the user adjust the map weights, those adjustments are applied to each of the two or more fragments.

In one or more embodiments, a record of the various components used to generate the final composite image (e.g., the composite image generated per equation (9) above, the detail maps, and the weights) can be maintained as associated with the final composite image. This record can be subsequently retrieved, allowing the user to readily re-adjust the detail map weights at a later time.

Thus, in response to each change to a map weight, rendering and compositing module 400 generates a composite image. The final detail mapping applied to the composite image is adjustable by the user without re-rendering the fragment model and target scene model.

The discussions herein refer to relighting fragments for insertion into content that is an image, although the techniques discussed herein apply analogously to video (e.g., a video in which a camera is panning around a scene or otherwise moving). Video can be treated as a sequence or stream of images (also referred to as frames), and fragments can be inserted into that sequence or stream of images using the techniques discussed herein. In one or more embodiments, to insert a fragment into a video, a fragment model for the fragment is obtained as discussed above. The fragment is at least a portion or piece of an image, which can be any visual content as discussed above.

A target scene model is generated for the video. A single image of the video can be selected (e.g., by a user, randomly, according to other rules or criteria, etc.), and the target scene model can be generated from the single image of the video as discussed above. Alternatively, multiple images of the video are selected and the target scene model is generated from the multiple images as discussed above (e.g., portions of the multiple images can be stitched together or otherwise combined to generate a combined image from which the target scene model is generated). One or more of the multiple images depict at least part of a scene not depicted in the other of the multiple images. Which images of the video are included in the multiple images can be identified in different manners, although the images are selected so as to be able to generate a model of the entire (or at least a threshold amount of) the scene. For example, content can be a video generated by panning a camera across a room. The portion of the room depicted in one image can be (and oftentimes is due to the panning) different from the portion of the room depicted in other images. By selecting multiple images of the video, a target scene model of the room can be generated rather than a target model of only the portion of the room depicted in a selected image.

A camera position for each image of the video is identified. This camera position refers to the direction or point of view of the camera that captured the images of the video (or, for a computer-generated video rather than a captured video, what the direction or point of view of a camera would have been had a camera captured the video). The camera position for each image of the video can be identified using any of a variety of publicly available and/or proprietary tracking techniques.

The fragment model can then be inserted into the target scene model, as discussed above. The target scene model can be rendered from different directions or points of view for each image of the video, with the particular direction or point of view for a particular image of the video being determined based on the identified direction or point of the camera for that image. The portion of the target scene model that is rendered can vary based on the direction or point of view for the image (e.g., resulting in the rendered image including only the portion of the target scene, with fragment inserted, that is visible within a field of view of a camera based on the direction or point of view).

The weights for various detail layers can be adjusted by receiving user input adjusting the weights for various detail layers of a single image of the video, and then applying those same weights to the other images in the video. Alternatively, the weights for various detail layers can be adjusted for each image of the video individually, or can be adjusted for groups of images. For example, user input adjusting the weights for various detail layers can be received for every 30$^{th}$ image, and the weights for various detail layers between every 30$^{th}$ image identified in other manners (e.g., the weights for detail layers of intervening images being the weight for the previous image, an average or interpolated weight between the two images for which user input adjusted weights are received, and so forth).

Alternatively, a different target scene model can be generated for each image of the video, the fragment model placed in each target scene model, and the target scene model with the inserted fragment model rendered as discussed above. Thus, the fragment can be added to the images of the video by adding the fragment to each individual image. The location of the fragment model can be identified by the user for each image, or alternatively can be identified automatically. For example, a location in one image that corresponds to a user-identified location in another image can be identified. This corresponding location can be identified in different manners using any of a variety of public and/or proprietary techniques, such as by analyzing the image or target scene model to determine the distance and/or direction of the user-identified location from other objects, elements, features, etc., and using this determined distance and/or direction to determine the corresponding location. The weights for various detail layers can be adjusted by receiving user input adjusting the weights for various detail layers of a single image of the video, and then applying those same weights to the other images in the video. Alternatively, the weights for various detail layers can be adjusted for each image of the video individually, or can be adjusted for groups of images as discussed above.

Figure 7:
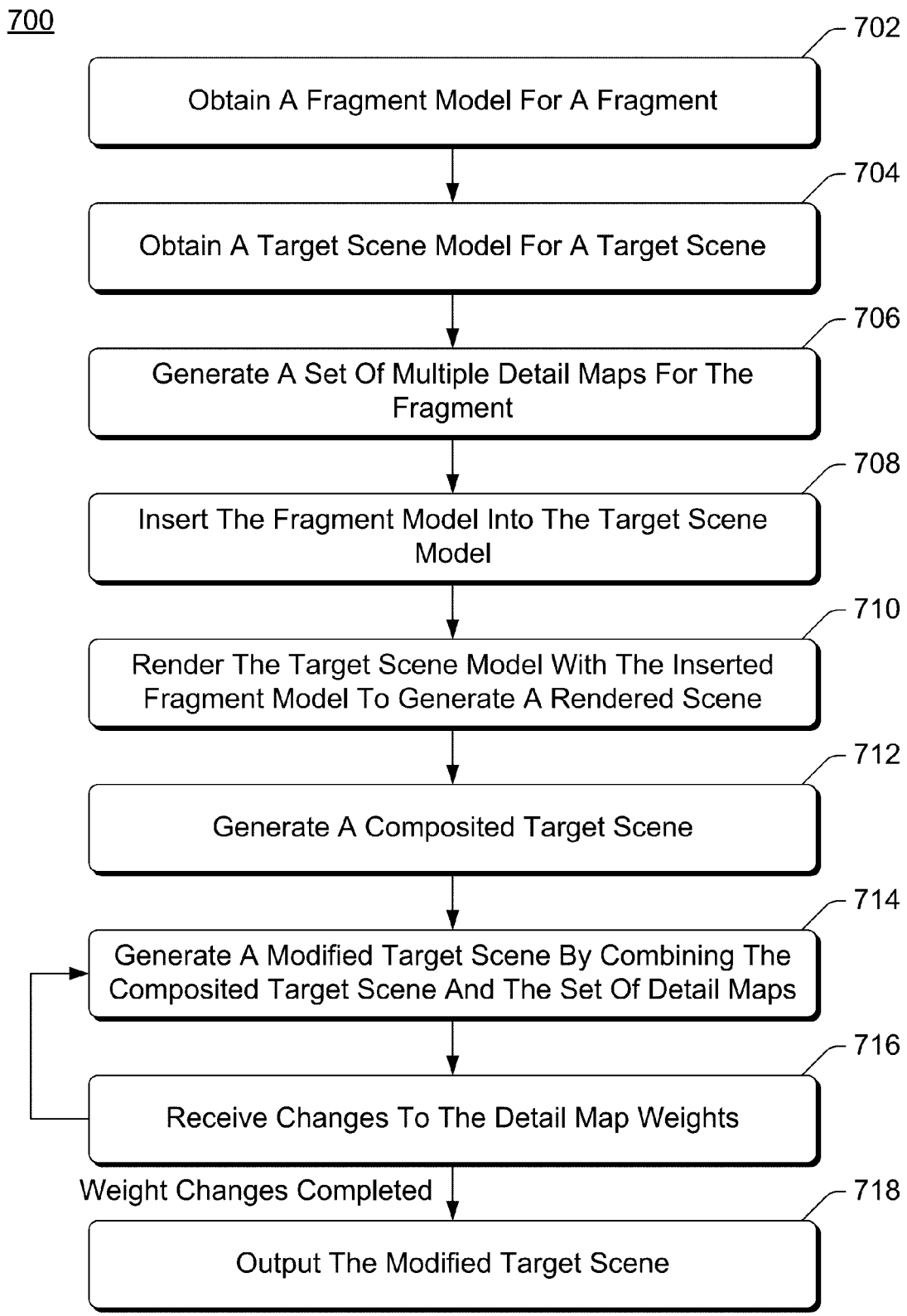
FIG. 7 is a flowchart illustrating an example process for implementing the relighting fragments for insertion into content in accordance with one or more embodiments.

FIG. 7 is a flowchart illustrating an example process 700 for implementing the relighting fragments for insertion into content in accordance with one or more embodiments. Process 700 can be implemented in software, firmware, hardware, or combinations thereof. Process 700 is carried out by, for example, a fragment relighting based insertion system 108 of FIG. 1, or modeling module 200 of FIG. 2 and rendering and compositing module 400 of FIG. 4. Process 700 is shown as a set of acts and is not limited to the order shown for performing the operations of the various acts. Process 700 is an example process for implementing the relighting fragments for insertion into content; additional discussions of implementing the relighting fragments for insertion into content are included herein with reference to different figures.

In process 700, a fragment model for a fragment is obtained (act 702). The fragment model includes, for example, a shape model of the fragment, an albedo map for the fragment, and an alpha map for the fragment, as discussed above. The fragment model can be generated or otherwise obtained in various manners, as discussed above.

A target scene model for a target scene is also obtained (act 704). The target scene is the scene into which the fragment is to be inserted. The target scene model can be generated or otherwise obtained in various manners, as discussed above.

A set of multiple detail maps for the fragment are generated (act 706). These detail maps can be generated based on the fragment model, as discussed above. Different detail maps can be included in the set of detail maps, such as a uniform illumination detail map, an inferred illumination detail map, and/or a parametric detail map.

The fragment model is inserted into the target scene model (act 708). The fragment model can be inserted into the system anywhere the user desires using various different techniques, as discussed above.

The target scene model with the inserted fragment model is rendered to generate a rendered scene (act 710). This rendering can be done using various different techniques, as discussed above.

A composited target scene is generated (act 712). This compositing is based on the rendered target scene including one or more inserted fragments, the rendered target scene without inserted fragments, the target scene, and an object mask as discussed above.

A modified target scene is generated by combining the composited target scene and the set of detail maps (act 714). Different detail map weights can be received via various different user inputs, as discussed above. Detail map weights can additionally and/or alternatively be received from other components or modules.

Changes to the detail map weights can also be received (act 716). In response to a change in the detail map weights, a new modified target scene is generated (act 714) by combining the composited target scene and the set of detail maps with the new detail map weights. Multiple changes to one or more of the detail map weights can be made, with the modified target image being generated in response to each change.

When the changes to the detail map weights are completed, the modified target scene is output (act 718). This outputting of the modified target scene can take various forms, such as saving the modified target scene to a storage device, transferring the modified target scene to another device or service, printing and/or displaying the modified target scene, and so forth.

Figure 8:
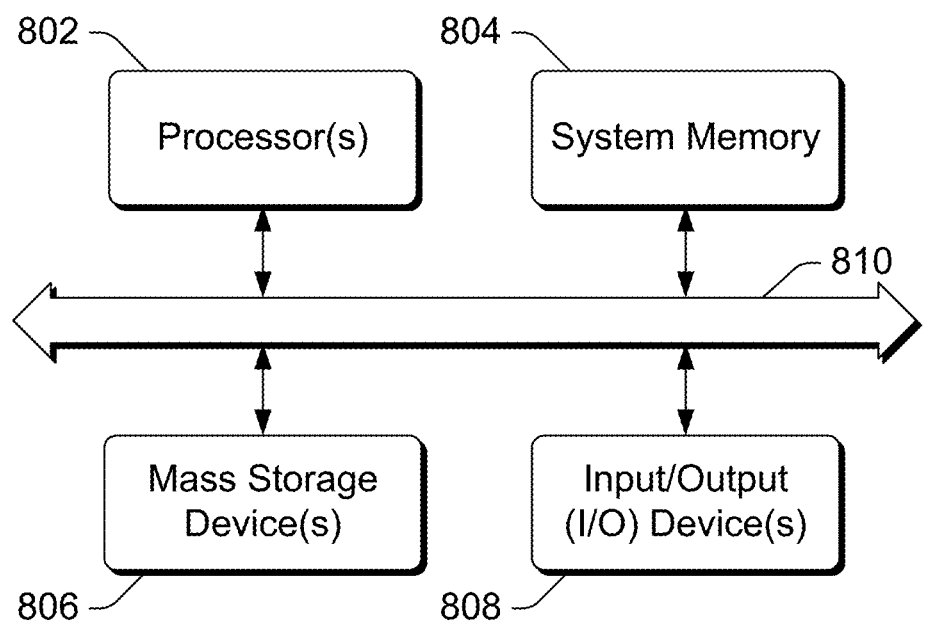
FIG. 8 is a block diagram illustrating an example computing device in which the relighting fragments for insertion into content can be implemented in accordance with one or more embodiments.

FIG. 8 is a block diagram illustrating an example computing device 800 in which the relighting fragments for insertion into content can be implemented in accordance with one or more embodiments. Computing device 800 can be used to implement the various techniques and processes discussed herein. Computing device 800 can be any of a wide variety of computing devices, such as a desktop computer, a server computer, a handheld computer, a laptop or netbook computer, a tablet or notepad computer, a personal digital assistant (PDA), an internet appliance, a game console, a set-top box, a cellular or other wireless phone, audio and/or video players, audio and/or video recorders, and so forth.

Computing device 800 includes one or more processor(s) 802, computer readable storage media such as system memory 804 and mass storage device(s) 806, input/output (I/O) device(s) 808, and bus 810. One or more processors 802, at least part of system memory 804, one or more mass storage devices 806, one or more of devices 808, and/or bus 810 can optionally be implemented as a single component or chip (e.g., a system on a chip).

Processor(s) 802 include one or more processors or controllers that execute instructions stored on computer readable storage media. The computer readable storage media can be, for example, system memory 804 and/or mass storage device(s) 806. Processor(s) 802 may also include computer readable storage media, such as cache memory. The computer readable storage media refers to media for storage of information in contrast to mere signal transmission, carrier waves, or signals per se. However, it should be noted that instructions can also be communicated via various computer readable signal bearing media rather than and/or in addition to computer readable storage media.

System memory 804 includes various computer readable storage media, including volatile memory (such as random access memory (RAM)) and/or nonvolatile memory (such as read only memory (ROM)). System memory 804 may include rewritable ROM, such as Flash memory.

Mass storage device(s) 806 include various computer readable storage media, such as magnetic disks, optical discs, solid state memory (e.g., Flash memory), and so forth. Various drivers may also be included in mass storage device(s) 806 to enable reading from and/or writing to the various computer readable storage media. Mass storage device(s) 806 include removable media and/or nonremovable media.

I/O device(s) 808 include various devices that allow data and/or other information to be input to and/or output from computing device 800. Examples of I/O device(s) 808 include cursor control devices, keypads, microphones, monitors or other displays, speakers, printers, network interface cards, modems, lenses, CCDs or other image capture devices, and so forth.

Bus 810 allows processor(s) 802, system 804, mass storage device(s) 806, and I/O device(s) 808 to communicate with one another. Bus 810 can be one or more of multiple types of buses, such as a system bus, PCI bus, IEEE 1394 bus, USB bus, and so forth.

Generally, any of the functions or techniques described herein can be implemented using software, firmware, hardware (e.g., fixed logic circuitry), manual processing, or a combination of these implementations. The terms "module" and "component" as used herein generally represent software, firmware, hardware, or combinations thereof. In the case of a software implementation, the module or component represents program code that performs specified tasks when executed on a processor (e.g., CPU or CPUs). The program code can be stored in one or more computer readable media, further description of which may be found with reference to FIG. 8. In the case of hardware implementation, the module or component represents a functional block or other hardware that performs specified tasks. For example, in a hardware implementation the module or component can be an application-specific integrated circuit (ASIC), field-programmable gate array (FPGA), complex programmable logic device (CPLD), and so forth. The features of the inserting objects into content techniques described herein are platform-independent, meaning that the techniques can be implemented on a variety of commercial computing platforms having a variety of processors.

Although the description above uses language that is specific to structural features and/or methodological acts in processes, it is to be understood that the subject matter defined in the appended claims is not limited to the specific features or processes described. Rather, the specific features and processes are disclosed as example forms of implementing the claims. Various modifications, changes, and variations apparent to those skilled in the art may be made in the arrangement, operation, and details of the disclosed embodiments herein.

What is claimed is:

1. A method comprising:
obtaining a fragment model for a fragment;
obtaining a target scene model for a target scene;
generating, based on the fragment model, a set of multiple detail maps for the fragment;
inserting the fragment model into the target scene model;
rendering the target scene model with the inserted fragment model to generate a rendered scene;
generating a composited target scene; and
generating a modified target scene by combining the composited target scene and the set of multiple detail maps.

2. A method as recited in claim 1, the obtaining the target scene model comprising generating the target scene model from the target scene.

3. A method as recited in claim 1, the obtaining the fragment model comprising generating the fragment model.

4. A method as recited in claim 1, the fragment model including a shape model of the fragment and an albedo map for the fragment, and the generating the set of multiple detail maps comprising generating the set of detail maps based on the shape model and the albedo map.

5. A method as recited in claim 1, the fragment model including a shape model of the fragment, an albedo map for the fragment, and an alpha map for the fragment.

6. A method as recited in claim 1, the set of detail maps including two or more of: a uniform illumination map, a parametric illumination map, and an inferred illumination map.

7. A method as recited in claim 1, the generating the composited target scene comprising generating the composited target scene by combining the rendered scene, the target scene, an object mask, and a rendered target scene without inserted fragments.

8. A method as recited in claim 7, wherein the composited target scene is a composited target scene C, the rendered scene is a rendered scene R, the target scene is a target scene I, the object mask is an object mask M, the rendered target scene without inserted fragments is a rendered target scene E, and the combining comprises:

$$C = M \odot R + (1-M) \odot (I + R - E).$$

9. A method as recited in claim 7, the generating the modified target scene comprising:
 receiving user inputs to change weights applied to the set of multiple detail maps; and
 combining the composited target scene and each weighted detail map of the set of multiple detail maps.

10. A method as recited in claim 9, wherein a first weight coefficient comprises $w_u$, a first weight gamma value comprises $\gamma u$, a first detail map of the set of multiple detail maps comprises $D_u$, a second weight coefficient comprises $w_p$, a second weight gamma value comprises $\gamma p$, a second detail map of the set of multiple detail maps comprises $D_p$, a third weight coefficient comprises $w_i$, a third weight gamma value comprises $\gamma i$, a third detail map of the set of multiple detail maps comprises $D_i$, the modified target scene comprises $C_{final}$, and the generating the modified target scene comprises:

$$C_{final} = C + w_u D_u^{\gamma u} + w_p D_p^{\gamma p} + w_i D_i^{\gamma i}.$$

11. A method as recited in claim 9, the combining the composited target scene comprising combining the composited target scene without re-rendering the target scene model with the inserted fragment model.

12. One or more computer readable storage media having stored thereon multiple instructions that, when executed by one or more processors of one or more devices, cause the one or more processors to perform acts comprising:
 obtaining a fragment model for a fragment;
 obtaining a target scene model for a target scene;
 generating, based on the fragment model, a set of multiple detail maps for the fragment;
 inserting the fragment model into the target scene model;
 rendering the target scene model with the inserted fragment model to generate a rendered scene;
 generating a composited target scene; and
 generating a modified target scene by combining the composited target scene and the set of multiple detail maps.

13. One or more computer readable storage media as recited in claim 12, the obtaining the target scene model comprising generating the target scene model from the target scene.

14. One or more computer readable storage media as recited in claim 12, the obtaining the fragment model comprising generating the fragment model.

15. One or more computer readable storage media as recited in claim 12, the fragment model including a shape model of the fragment and an albedo map for the fragment, and the generating the set of multiple detail maps comprising generating the set of detail maps based on the shape model and the albedo map.

16. One or more computer readable storage media as recited in claim 12, the fragment model including a shape model of the fragment, an albedo map for the fragment, and an alpha map for the fragment.

17. One or more computer readable storage media as recited in claim 12, the set of detail maps including two or more of: a uniform illumination map, a parametric illumination map, and an inferred illumination map.

18. One or more computer readable storage media as recited in claim 12, the generating the composited target scene comprising generating the composited target scene by combining the rendered scene, the target scene, an object mask, and a rendered target scene without inserted fragments.

19. One or more computer readable storage media as recited in claim 18, wherein the composited target scene is a composited target scene C, the rendered scene is a rendered scene R, the target scene is a target scene I, the object mask is an object mask M, the rendered target scene without inserted fragments is a rendered target scene E, and the combining comprises:

$$C = M \odot R + (1-M) \odot (I + R - E).$$

20. One or more computer readable storage media as recited in claim 18, the generating the modified target scene comprising:
 receiving user inputs to change weights applied to the set of multiple detail maps; and
 combining the composited target scene and each weighted detail map of the set of multiple detail maps.

21. One or more computer readable storage media as recited in claim 20, wherein a first weight coefficient comprises $w_u$, a first weight gamma value comprises $\gamma u$, a first detail map of the set of multiple detail maps comprises $D_u$, a second weight coefficient comprises $w_p$, a second weight gamma value comprises $\gamma p$, a second detail map of the set of multiple detail maps comprises $D_p$, a third weight coefficient comprises $w_i$, a third weight gamma value comprises $\gamma i$, a third detail map of the set of multiple detail maps comprises $D_i$, the modified target scene comprises $C_{final}$, and the generating the modified target scene comprises:

$$C_{final} = C + w_u D_u^{\gamma u} + w_p D_p^{\gamma p} + w_i D_i^{\gamma i}.$$

22. One or more computer readable storage media as recited in claim 20, the combining the composited target scene comprising combining the composited target scene without re-rendering the target scene model with the inserted fragment model.

23. A system implemented at least in part in hardware, the system comprising:
 a modeling module configured to:
  obtain a fragment model for a fragment;
  obtain a target scene model for a target scene;
  generate, based on the fragment model, a set of multiple detail maps for the fragment; and
 a rendering and compositing module configured to:
  insert the fragment model into the target scene model;
  render the target scene model with the inserted fragment model to generate a rendered scene;
  generate a composited target scene;
  generate a modified target scene by combining the composited target scene and the set of multiple detail maps.

* * * * *